UNITED STATES PATENT OFFICE.

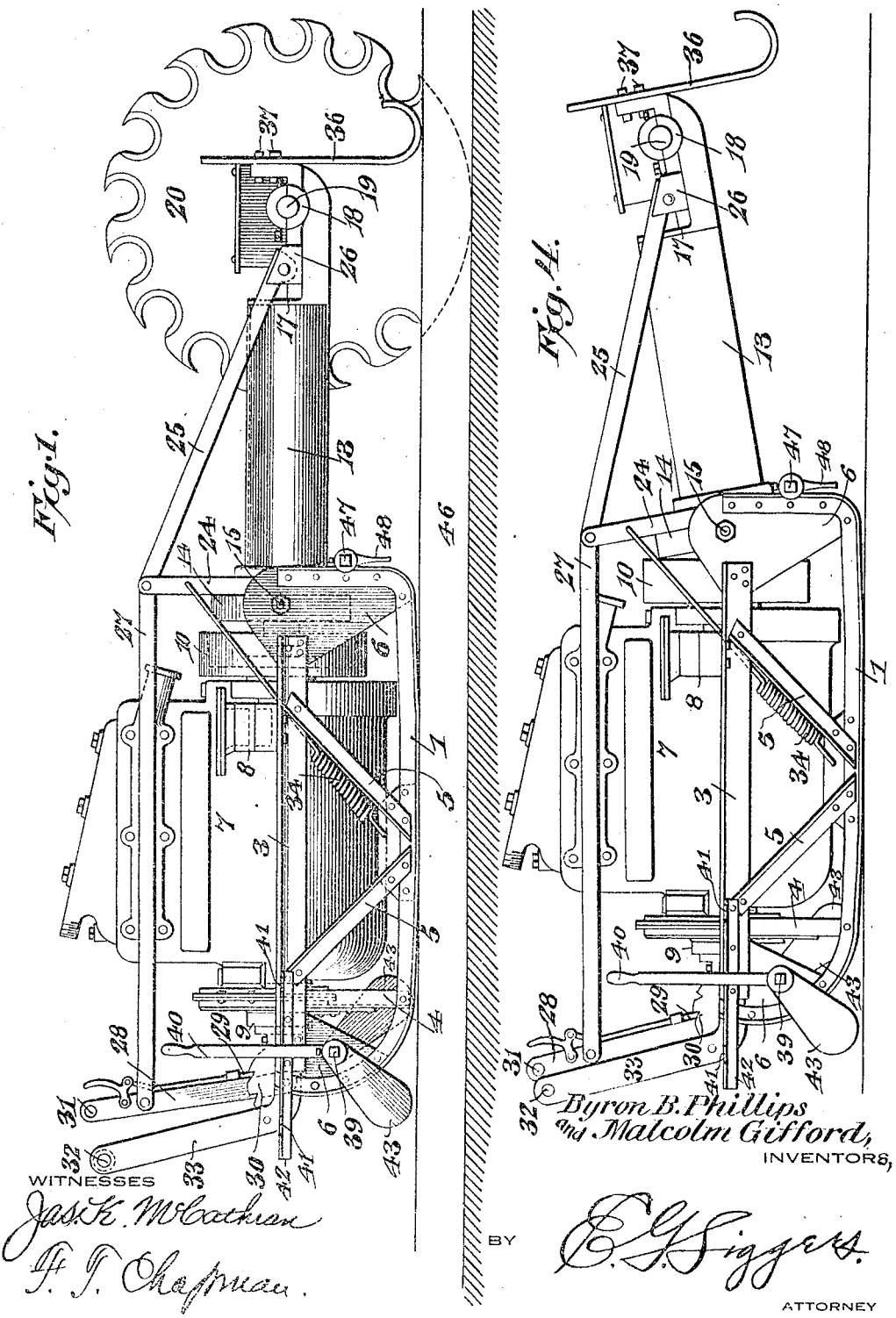

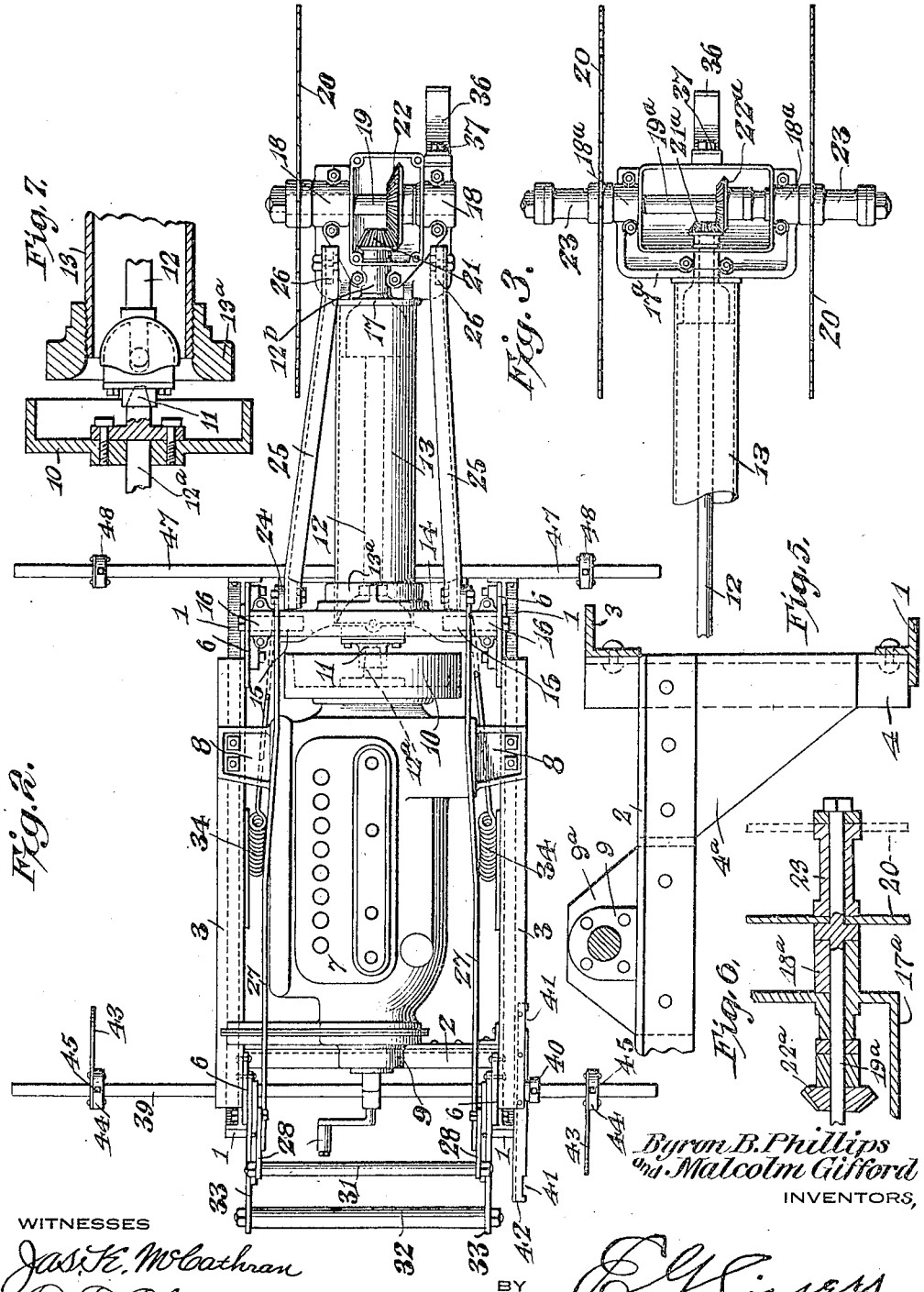

BYRON B. PHILLIPS AND MALCOLM GIFFORD, OF HUDSON, NEW YORK, ASSIGNORS TO GIFFORD-WOOD COMPANY, OF HUDSON, NEW YORK, A CORPORATION OF NEW YORK.

ICE-SAWING MACHINE.

1,292,040.  Specification of Letters Patent.  Patented Jan. 21, 1919.

Application filed July 3, 1917. Serial No. 178,452.

*To all whom it may concern:*

Be it known that we, BYRON B. PHILLIPS and MALCOLM GIFFORD, citizens of the United States, residing at Hudson, in the county of Columbia and State of New York, have invented a new and useful Ice-Sawing Machine, of which the following is a specification.

This invention has reference to ice sawing machines, and its object is to provide a machine for sawing grooves in a field of ice preparatory to havesting the ice.

It is customary to cut grooves part of the way through, and in some instances, entirely through the ice and it is further customary to cut the grooves in series across a field of ice and also at right angles to the first series of cuts, dividing the field off into blocks which may be of a standard size, say 22 by 32 inches, although the invention is not necessarily limited to any particular size of block.

In accordance with the invention, there is provided a machine, which, if used upon ice, may have a sled-like support which is easily drawn or propelled over an icy surface. The sled carries a prime mover, preferably in the form of an explosion engine, and connected to the prime mover so as to be driven thereby, is a cutter which may be in the form of a circular saw, or in some instances, two such saws may be used.

Provision is also made for guiding the machine so that after a first cut is made along or across the field of ice, subsequent cuts may be made in parallelism therewith.

The invention is characterized by simplicity and lightness of construction and by ease of manipulation, both as to control and propulsion.

The invention will be best understood by a consideration of the following detailed description, taken in connection with the accompanying drawings, forming a part of this specification, with the understanding, however, that the invention is not confined to any strict conformity with the showing of the drawings, but may be changed and modified so long as such changes and modifications mark no material departure from the salient features of the invention as expressed in the appended claims.

Referring to the drawings:—

Figure 1 is a side elevation of a machine embodying the invention, but omitting some parts which are not essential to the understanding of the invention;

Fig. 2 is a plan view of the machine shown in Fig. 1;

Fig. 3 is a plan view of a slightly modified form of a portion of the invention as shown in Figs. 1 and 2.

Fig. 4 is a view similar to Fig. 1, but omitting some parts shown in Fig. 1, and showing a different position of certain parts.

Fig. 5 is a detail view partly in section to show the front mounting of the engine and the proximate parts.

Fig. 6 is a transverse section through one side of the head block and the saw arbor shown in Fig. 3.

Fig. 7 is a detail section on an enlarged scale to show the universal coupling connection between the shaft that drives the saw arbor and the engine shaft.

Referring to the drawings, there is shown a sled structure made up of runners 1 which, for strength and lightness, may be formed of structural steel members. These members constitute the runners of the sled and are curved upwardly at their forward ends and bent upwardly at an angle at their rear ends. The said runners are joined near one end by a cross bar 2 which may also be made of angle structural steel, the sides of the sled being further composed of longitudinal strips 3, knees 4 and angle braces 5, all of which parts may, for the sake of simplicity and strength, be made of structural steel of any suitable, though preferable angle form. Upon reference to Fig. 5, it will be seen that the knee 4 is secured to the runner at the lower end, and to the side strip 3 and the cross bar 2 at the upper end, a plate $4^a$ serving to stiffen the connection between the cross bar and the knee.

The sled is further braced and stiffened by gusset plates 6 at the two ends of the runners. The gusset plates at the forward end are connected to the runners and the side strips, while the gusset plates at the rear end join the ends of the side strips to the upturned ends of the runners, and also have other functions which will be later set forth.

Mounted on the sled is an explosion engine 7 which, because it may be any one of numerous available types, requires no special description. In the particular showing of the drawings, the motor has a three-point suspension on the side beams 3 at 8 and the cross beam 2 at 9. The lugs 8 extend from the sides of the engine near the rear end and rest upon the side beams and are bolted thereto. The front end of the engine has a bearing in a plate $9^a$ bolted to the cross beam as shown in Fig. 5.

The motor is also shown as provided with a fly-wheel 10 mounted on a shaft $12^a$ (Fig. 7) and connected by a universal joint coupling 11 with a power shaft 12 extending from the machine in the general line of the length of the engine but capable of being deflected from such line. The universal coupling which is shown clearly in Fig. 7 is of ordinary construction and requires no description.

The shaft 12 extends axially through a tube 13 threaded at its inner end in a collar $13^a$ (Fig. 7) carried by a casting 14 formed with a suitable flange made fast to the corresponding ends of the side beams 3.

The casting 14 constitutes a hinged frame having pivot supports 15 in bearings 16 so that the tube 13 and parts carried thereby may be moved about an axis which, when the machine is in operation, is substantially horizontal and which axis coincides with the center of the universal joint 11. The journal bearings 16 are made fast to the adjacent gusset plates 6.

The end of the tube 13 remote from its pivot support on the sled frame is shrunk on a collar (shown in dotted lines Figs. 2 and 3) extending from a head block 17 carrying journal bearings 18 for a shaft 19 constituting an arbor for a saw 20 in the structure of Figs. 1 and 2, and also a journal bearing $12^b$ for the rear or outer end of shaft 12. The structure in Fig. 3 differs from that of Figs. 1 and 2 in that the head block 17 is replaced by a somewhat wider head block $17^a$ carrying journal bearings $18^a$ for a saw arbor or shaft $19^a$. The construction of the head block is similar to that disclosed in my co-pending application Serial Number 188,965 and is claimed therein.

The shaft 12 is provided at the end located at the block 17 with a bevel pinion 21 meshing with a bevel gear wheel 22 on the shaft or arbor 19. In the structure of Fig. 3, a bevel pinion $21^a$ and a bevel gear wheel $22^a$ take the place of the similar structures in Figs. 1 and 2. It will be observed that the head block provides bearings for the driven shaft 12 and the saw arbor, a casing for the pinions or bevel gears 21, 22 and a cup for containing oil in which the gears operate.

In the showing of Figs. 3 and 6, each end of the saw arbor $19^a$ has spacer sleeves having inner and outer clamping faces 23 so that the saws 20, of which there are provided two in the showing of Fig. 3, may be variously spaced apart and particularly may be located apart by distances corresponding to the ordinary spacing of the saw cuts in the ice. When the saws 20 in Fig. 3 are located between the clamping faces close to the head $17^a$, the saws are spaced 22 inches apart, and when between the clamping faces at the other ends of the sleeves 23, as indicated in dotted lines Fig. 6 they are spaced 32 inches apart if the usual spacing of the saw cuts be followed, whereby oblong blocks of ice 22 inches by 32 inches are produced.

Secured and rising from the block or flange casting 14 on opposite sides of the tube 13 are posts 24 from the upper end of each of which there extends a link 25 pivotally connected at the other end to a correspondingly placed ear 26 on the head block 17. The upper ends of the posts 24 are also connected by respective links 27 to levers 28 pivotally mounted and rising from the rear ends of the side beams 3 of the sled, each lever 28 being provided with a thumb latch 29 in operative relation to a corresponding rack segment 30. The levers 28 are joined by a connecting bar 31 for simultaneous movement, the arrangement being such that an operator standing at the end of the sled remote from the saw is enabled to lift the saw about the pivotal axis of the casting 14 or to lower the saw until suitably located with reference to the ice, to cut therein a groove or grooves of the desired depth, see Figs. 1 and 4.

In order to guide and otherwise manipulate the sled and saw with relation to the ice, there is provided a handle member 32 carried by arms 33 made fast to that end of the sled remote from the saw. It should be explained that the operator draws the machine along, being assisted by the feed of the saw through the ice.

In order to, in a measure, counteract the weight of the saw and parts carrying it, springs 34 are provided, with one end of each spring connected to a respective post 24, and the other end of the spring to a runner 1 or to any other suitable part of the sled.

At the end of the head 17 remote from the tube 13, or at any other suitable point there is provided a support 36 held to the head 17 by bolts 37 or otherwise in a manner permitting the up and down adjustment of the support 36. To facilitate the movement of the support over the ice on which it rests when the machine is in operation, the lower end of the support is suitably curved to form a shoe which will travel along the ice without liability of catching in any projection or depression thereof. This support regulates the depth of cut and at the same time acts as the third runner on the ice, being located on a line intermediate of the other two runners 1, 1.

At the end of the sled remote from the saw and suitably journaled in the gusset plates 6 at the corresponding end of the sled is a rock shaft 39 under the control of a manipulating lever 40 capable of engaging in either one of two spaced notches 41 in a bar 42 carried by a corresponding one to the side beams 3. The shaft 39 carries two guide blades 43 at suitably different angles to the longitudinal axis of the shaft, these blades being adjustable lengthwise to the shaft as by means of respective hubs 44 and set screws 45. The arrangement is such that when the shaft 39 is in neutral position, both blades 43 are elevated above the surface of the ice upon which the sled rests. When the shaft is rocked in one direction so as to engage the notch 41, one of the blades 43 will enter a groove 46 already cut in the ice, and when the shaft is rocked in the other direction to a sufficient extent, the first guide blade is lifted from the groove and the other guide blade is moved into a groove 46.

At that end of the sled toward the saw 20 is a bar 47 which may be of about the same length as the shaft 39 and projects to the same extent as the shaft 39 beyond the sides of the sled. The bar 47 carries adjustable pointers 48 which are used to locate the corresponding portion of the sled with respect to the same groove 46 in which the depressed guide plate 43 engages. In this way, the saw may be accurately located for producing a cut in the ice from a cut previously made. It is, therefore, quite easy to score or cut the surface of the ice with the cuts in sufficiently accurate parallel relation. If, instead of having pointers 48 associated with the blades 43, a double set of blades were provided, it would be impossible to prevent binding in the ice, for there would then be three elements engaging the cut in the ice, viz: the saw and the two blades. The multiplication of engaging elements would increase the friction and tendency to bind and cause an irregular cut.

When the desired surface has been cut or grooved in one direction, the machine is turned at right angles to the first direction and the surface of the ice is cut or grooved in a corresponding direction, thus laying off the surface into blocks which, in accordance with the usual practice, are oblong blocks of about 22 by 32 inches.

The ice sawing machine is intended particularly as a one-man machine of such simple construction that it may be drawn over the ice by an operator walking upon the ice. Furthermore, the arrangement is such that there is a direct drive between the crank shaft of the explosion engine and the transmission shaft leading to the saw, with an interposed universal joint in the axis of rocking of the transmission shaft, the latter being approximately or actually horizontal when the saw is in operative engagement with the ice and cutting a groove therein.

It will be noted that the engine extends lengthwise of the machine and is mounted between and joins the sled runners and stiffens the same and that it depends below the side bars 3 close to the runners thereby distributing the weight in the most effective manner.

What is claimed is:—

1. An ice sawing machine comprising two spaced sled runners, side and cross bars spaced above the runners and connected therewith to form a rigid sled frame, an engine arranged lengthwise within the said frame and depending below the said side and cross bars nearly to the plane of the runners, means for rigidly connecting said engine at each side and one end to the side and cross bars respectively forming a three-point suspension of the engine within said frame, a saw carrying member mounted between the runners at one end and projecting beyond the latter, and means for driving said member from the engine.

2. An ice sawing machine, comprising a single sled frame, a motor mounted thereon, a tubular member, means for pivotally connecting one end of said member to one end of said frame, the remaining portion of said member projecting beyond said frame, a saw arbor mounted upon the other end of said member remote from said frame, direct driving connections between the motor and the saw arbor, said connections passing through and inclosed within said tubular member, and including a joint which permits the up-and-down movement of said member with the saw arbor and driving connections, and means mounted upon the sled frame and having connection with the outer end of said member for raising and lowering said member and the attached parts.

3. An ice sawing machine, comprising a sled frame, a motor mounted thereon, a tubular member, means for pivotally connecting the inner end of said member to the sled frame, a saw arbor mounted on the outer end of said member and carrying a saw, a single transmission shaft inclosed within said member for transmitting motion from said shaft to the saw arbor, and direct connections between the inner end of the transmission shaft and the motor, said connections including a universal joint.

4. An ice sawing machine, comprising spaced sled runners, a rigid frame mounted upon said runners, a motor rigidly mounted upon said frame and extending lengthwise of the frame and having its drive shaft located at one end of the frame and runners, a tubular member pivoted at one end to the frame and having its major portion extending beyond the latter, a saw arbor mounted at the outer end of the tubular member and carrying a saw, a transmission shaft geared to the saw arbor and housed within said member, and direct connections between the transmission shaft and the drive shaft of the motor, said connections including a universal joint, whereby the saw arbor may be driven by the motor in different positions of adjustment of the said member.

5. An ice sawing machine comprising spaced sled runners, a motor mounted thereon and extending lengthwise of the machine, a tube pivoted at one end to the sled runners and projecting therefrom, a saw arbor at the outer end of the tube and carrying a saw, a transmission shaft geared to the saw arbor and housed within the tube, direct connections between the transmission shaft and the shaft of the motor, including a universal joint which is in substantial alinement with the pivot point of the tube, whereby the saw arbor may be driven by the motor in different positions of adjustment of the tube, and supporting and actuating means for the outer end of the tube.

6. An ice sawing machine comprising spaced sled runners and a frame including longitudinal strips, a cross bar connecting the sled runners near one end of the machine, a motor connecting the other end of the sled runners and supported by the cross bar, said motor being supported by the sled runners intermediate of the height of the motor and extending lengthwise of the machine, a tube having one end pivoted to the sled runners and projecting therefrom lengthwise of the machine, saw carrying means mounted on the outer end of the tube and provided with connections to the motor through the tube, and adjusting means for the tube for moving the latter in an upright arc, said adjusting means extending to the opposite end of the machine for manipulation thereof.

7. An ice cutting machine comprising a sled formed of a pair of runners and a frame mounted on the runners and rigidly connected thereto, an engine mounted within the frame and extending lengthwise of the runners, means for rigidly connecting the engine to the frame, a transmission shaft also extending lengthwise of the frame and projecting outwardly beyond the same, a head block in which the outer end of the transmission shaft is journaled, a saw arbor journaled in the head block transversely of the transmission shaft, gear connections between the transmission shaft and the saw arbor, a saw mounted on the saw arbor, a frame between the rear ends of the runners, a tubular member secured to the head block at the outer end and connected to the said hinged frame at the inner end, means for pivotally connecting the hinged frame to the runner frame, and a universal joint connection between the transmission shaft and the engine shaft, the axis of rocking of the hinged frame being in transverse alinement with the universal joint connection, and means for raising and lowering the tubular member, and the parts connected therewith.

8. An ice sawing machine comprising two spaced sled runners, side and cross bars spaced above the runners and connected therewith to form a rigid sled frame, an engine mounted lengthwise within said frame and depending below the said side and cross bars, means for rigidly connecting said engine to the side and cross bars, a frame at the rear end of the sled frame, means for pivotally connecting said hinged frame to the sled frame so as to turn on a horizontal axis, a tubular member rigidly connected at its inner end to the hinged frame, a saw arbor connected to the tubular member at its outer end and carrying a saw, a transmission shaft within the tubular member and geared at its outer end to the saw arbor, and a universal joint connection between the inner end of the transmission shaft and the engine shaft, said connection being in substantially transverse alinement with the axis of the said hinged frame.

9. In an ice cutting machine, the combination with a sled frame, an engine mounted thereon, a transmission shaft, means for connecting said shaft with the shaft of the engine, said means including a universal joint, said transmission shaft having its major portion projecting beyond the sled frame, a tubular member inclosing said transmission shaft, a head block rigidly connected to the outer end of said tubular member, a saw arbor carrying a saw and journaled in said head block, gear connections between said transmission shaft and said arbor, a hinged connection between said tubular member and the sled frame, a pair of inclined links pivotally connected at their rear ends to the head block, and located on each side of the tubular member, supports for the forward ends of said links located contiguous to said hinged connection, another pair of links connected with the supports, and levers connected for joint operation and in turn connected to the last-mentioned links.

10. In an ice cutting machine, the combination with a sled frame, an engine mounted thereon, a transmission shaft, a tubular member inclosing said shaft, a head block connected to the outer end of said member, a saw arbor carrying a saw and journaled in said head block, gear connections between said shaft and said arbor, means for connecting said shaft with the engine shaft, said means including a universal joint, a hinged connection between said tubular member and the sled frame, posts rising from said hinged connection, links connecting the posts to said tubular member, levers connected for joint operation, links connecting the levers to the posts, and coiled springs connected with the sled frame and having connection with said links to counteract the weight of the saw and the connected parts.

11. An ice sawing machine comprising a sled, an explosion engine mounted thereon with the engine shaft arranged lengthwise of the sled, a tubular member provided at one end with a head block and at the other end with a casting having pivotal supports in the corresponding end of the sled, a saw arbor mounted in the head block, a transmission shaft extending lengthwise through the tubular member and journaled in the head block, gearing connections between the transmission shaft and the saw arbor, a universal joint connection between the other end of the transmission shaft and the power shaft of the engine, and means for rocking the tubular member and parts carried thereby toward and from the ice upon which the sled is supported, the tubular member and transmission shaft having a position of substantial alinement with the engine shaft when the saw carried by the saw arbor is cutting a groove in the ice.

12. An ice cutting machine comprising a structural steel sled having runners, an explosion engine mounted on the runners, a casting pivotally connected to the runners to rock on a substantially horizontal axis, a tubular member fast to the casting and projecting therefrom and from the corresponding end of the sled, a head block at the end of the tubular member remote from the casting, a saw arbor journaled in the head block transversely of the length of the tubular member, a transmission shaft journaled at one end in the head block and provided with gear connections to the saw arbor, said transmission shaft extending through the tubular member and provided with a universal joint connection to the engine shaft with said universal joint in the axis of rocking of the casting, and means for rocking the tubular member and shaft extending therethrough, with the axis of rocking of said tubular member related to the tread of the sled to cause the transmission shaft to be approximately in line with the engine shaft when the saw on the saw arbor is engaging the ice and cutting a groove therein.

13. In an ice sawing machine, a sled, ice sawing means, including a saw arbor, carried by the sled, with the saw arbor beyond one end of the sled, guide blades on the other end of the sled for entering cut grooves in the ice, and pointers on the same end of the sled as the saw arbor and located high enough to clear the ice, to position the sled with respect to a groove entered by a guide blade to locate a saw on the saw arbor for cutting a new groove in the ice.

In testimony that we claim the foregoing as our own, we have hereto affixed our signatures in the presence of two witnesses.

BYRON B. PHILLIPS.
MALCOLM GIFFORD.

Witnesses:
BENEDICT GIFFORD,
A. D. HEYL.

Copies of this patent may be obtained for five cents each, by addressing the "Commissioner of Patents, Washington, D. C."